United States Patent
Angwin et al.

(10) Patent No.: US 9,665,467 B2
(45) Date of Patent: May 30, 2017

(54) ERROR AND SOLUTION TRACKING IN A SOFTWARE DEVELOPMENT ENVIRONMENT

(71) Applicant: International Business Machines Corporation, Armonk, NY (US)

(72) Inventors: Rebecca F. M. Angwin, Surrey (GB); Samuel C. Cresswell, Cardiff (GB); Rosie H. Lowther, West Sussex (GB); Anthony P. Papageorgiou, Winchester (GB); Joe D. S. Pavitt, Chandlers Ford (GB); Toluwanimofe Salami, Kent (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/754,808

(22) Filed: Jun. 30, 2015

(65) Prior Publication Data

US 2017/0004065 A1    Jan. 5, 2017

(51) Int. Cl.
| | |
|---|---|
| G06F 9/44 | (2006.01) |
| G06F 11/36 | (2006.01) |
| G06F 11/34 | (2006.01) |

(52) U.S. Cl.
CPC .......... *G06F 11/3636* (2013.01); *G06F 8/70* (2013.01); *G06F 11/34* (2013.01); *G06F 11/3668* (2013.01); *G06F 11/3692* (2013.01)

(58) Field of Classification Search
CPC ....................... G06F 11/30–11/3696
See application file for complete search history.

(56) References Cited

U.S. PATENT DOCUMENTS

| | | | |
|---|---|---|---|
| 9,183,074 B2 * | 11/2015 | Michel | G06F 11/3664 |
| 9,189,317 B1 * | 11/2015 | Marimuthu | G06F 11/366 |
| 2006/0005169 A1 * | 1/2006 | Berstis | G06F 11/366 717/125 |
| 2008/0244325 A1 | 10/2008 | Tyulenev | |
| 2009/0013208 A1 | 1/2009 | DiMuzio | |
| 2009/0044055 A1 * | 2/2009 | Wang | G06F 11/2294 714/27 |
| 2009/0292941 A1 | 11/2009 | Ganai et al. | |

(Continued)

OTHER PUBLICATIONS

Jalbert, Nicholas et al., "Automated Duplicate Detection for Bug Tracking Systems", 2008, pp. 52-61.*

(Continued)

*Primary Examiner* — Thuy Dao
*Assistant Examiner* — Christopher Franco
(74) *Attorney, Agent, or Firm* — Edward J. Wixted, III (57) ABSTRACT

In an approach for error and solution tracking a processor identifies that a first occurrence of a first error is present in code. A processor tracks a first set of actions made to the code which affect the first occurrence of the first error. A processor determines that the first occurrence of the first error has been resolved. A processor records the first error and the first set of actions to the code. A processor identifies that a second occurrence of the first error is present in the code. A processor determines that the first error has previously occurred. A processor retrieves the first set of actions. A processor causes the first set of actions to be made to the code to affect the second occurrence of the first error.

11 Claims, 7 Drawing Sheets

(56) References Cited

U.S. PATENT DOCUMENTS

| | | | | |
|---|---|---|---|---|
| 2009/0327809 A1* | 12/2009 | Joy | ................. | G06F 11/3636 |
| | | | | 714/26 |
| 2012/0246623 A1 | 9/2012 | Creel | | |
| 2013/0007700 A1 | 1/2013 | Villar et al. | | |
| 2014/0380105 A1* | 12/2014 | Michel | ............... | G06F 11/3664 |
| | | | | 714/57 |
| 2015/0269060 A1* | 9/2015 | Rodmell | ............ | G06F 11/3664 |
| | | | | 717/124 |
| 2016/0291970 A1* | 10/2016 | Mallisetty | ............ | G06F 11/368 |

OTHER PUBLICATIONS

Ekanayake, Jayalath et al., "Tracking Concept Drift of Software Projects Using Defect Prediction Quality", 2009, pp. 51-60.*

Ahsan, Syed Nadeem et al., "Automatic Software Bug Triage System (BTS) Based on Latent Semantic Indexing and Support Vector Machine", 2009, pp. 216-221.*

Baker, Brenda S., "On Finding Duplication and Near-Duplicat ion in Large Software Systems", 1995, pp. 86-95.*

Nguyen, Anh Tuan et al., "Multi-layered Approach for Recovering Links between Bug Reports and Fixes", 2012, pp. 1-11.*

Kawamitsu, Naohiro, et al., "Identifying Source Code Reuse across Repositories using LCS-based Source Code Similarity", 2014, pp. 305-314.*

Hartmann et al.; "What Would Other Programmers Do? Suggesting Solutions to Error Messages"; CHI 2010: Understanding and Supporting Programming; Apr. 10-15, 2010; pp. 1019-1028; ACM.

"Gammified Issue Tracking System"; An IP.com Prior Art Database Technical Disclosure; IP.com No. 000230897; Sep. 17, 2013; pp. 1-3.

\* cited by examiner

ERROR AND SOLUTION TRACKING IN A SOFTWARE DEVELOPMENT ENVIRONMENT

BACKGROUND

The present invention relates to software development, and more specifically, to error and solution tracking in a software development environment.

It is often the case while a software developer is programming, he or she may produce an error which had previously been solved in the past.

Existing solutions would be to use websites to find additional users which have encountered the same error. However, such solutions may be specific depending on additional factors, for example, the programming language, external libraries, file paths and software and hardware specifications.

An additional solution could be to make use of source control repositories and revert back to an older version of working code, but reverting back to a stable version means additional functionality created between the stable and unstable version is lost.

Error logs are traditionally the first point of call when an error is created, however, they were initially designed to keep storage usage low, given the limited room available in the past. As storage usage is now less of an issue, error logs have failed to become more explanatory and in most cases remain useless to the user.

Therefore, there is a need in the art to address the aforementioned problems.

SUMMARY

Aspects of an embodiment of the present invention disclose an approach for an approach for error and solution tracking. In one embodiment, a processor identifies that a first occurrence of a first error is present in code. In one embodiment, a processor tracks a first set of actions made to the code which affect the first occurrence of the first error. In one embodiment, a processor determines that the first occurrence of the first error has been resolved. In one embodiment, a processor records the first error and the first set of actions to the code. In one embodiment, a processor identifies that a second occurrence of the first error is present in the code. In one embodiment, a processor determines that the first error has previously occurred. In one embodiment, a processor retrieves the first set of actions. In one embodiment, a processor causes the first set of actions to be made to the code to affect the second occurrence of the first error.

DETAILED DESCRIPTION

As will be appreciated by one skilled in the art, aspects of the present invention may be embodied as a program, method or computer program product. Accordingly, aspects of the present invention may take the form of an entirely hardware embodiment, an entirely software embodiment (including firmware, resident software, micro-code, etc.), or an embodiment combining software and hardware aspects which may generally be referred to herein as a "circuit," "module", or "program." Furthermore, aspects of the present invention may take the form of a computer program product embodied in one or more computer-readable medium(s) having computer readable program code/instructions embodied thereon.

Embodiments of the present invention disclose a method, computer program product, and computer system to track errors and solutions in a software development environment.

The present invention will now be described in detail with reference to the Figures.

If the developer cannot remember the solution to the error, there are no known tools to automatically suggest a solution based on the way the problem has been solved in the past. A tracking program is described herein which is triggered when a new error is created while a developer is programming. As the program tracks, the program keeps a record of the changes in code from the state the error is created to the state the error is resolved. When the programmer creates an error which tracking program 406 recognizes as one previously encountered, the program offers a least one suggestion dependent on at least one set of changes which the programmer made to the same error in a previous case.

Tracking program 406 is triggered when an error is created. For example, if there was a build error, the details of the error could be obtained from error logs when the code is compiled. Alternatively, if the programmer's project was web-based, details of any runtime errors created could be obtained from the console of the appropriate web browser. The program may trigger for errors, independent on whether the error has appeared before, and the triggering means the program could potentially offer more relevant suggestions in the future.

Supposing there is a program to track errors created and removed as a developer is programming, there remains a problem with when to define an error as having been solved. The removal of one specific error state is considered to be the fix of the error. However, the program is often the case in programming fixing one error leads to the creation of additional errors. For the developer, the solution of one error cannot be considered a complete fix; the solution is only once the code includes zero errors which the code may be considered a stable, fixed state. Therefore, there is a need to monitor and relate the chain of errors and their solutions until a stable state is found.

Tracking program 406 may track a chain of errors and their solutions, caused as a developer fixes each error in turn. As the program tracks, the program keeps a record of the error states between the start point (when a particular error is created) and the end point (when the particular error is resolved). However, the fix is not considered complete if any related errors remain. A related error is defined as an error introduced between the start and end points. Once there are no related errors, the code is considered to be in a fixed state. The overall fix to the original error is treated as the series of intermediary fixes which lead to the fixed state. In the future, when the programmer creates an error tracking program 406 recognizes due to past errors, the program offers the overall fix to the error, detailing the intermediary fixes required.

Figure 1A:
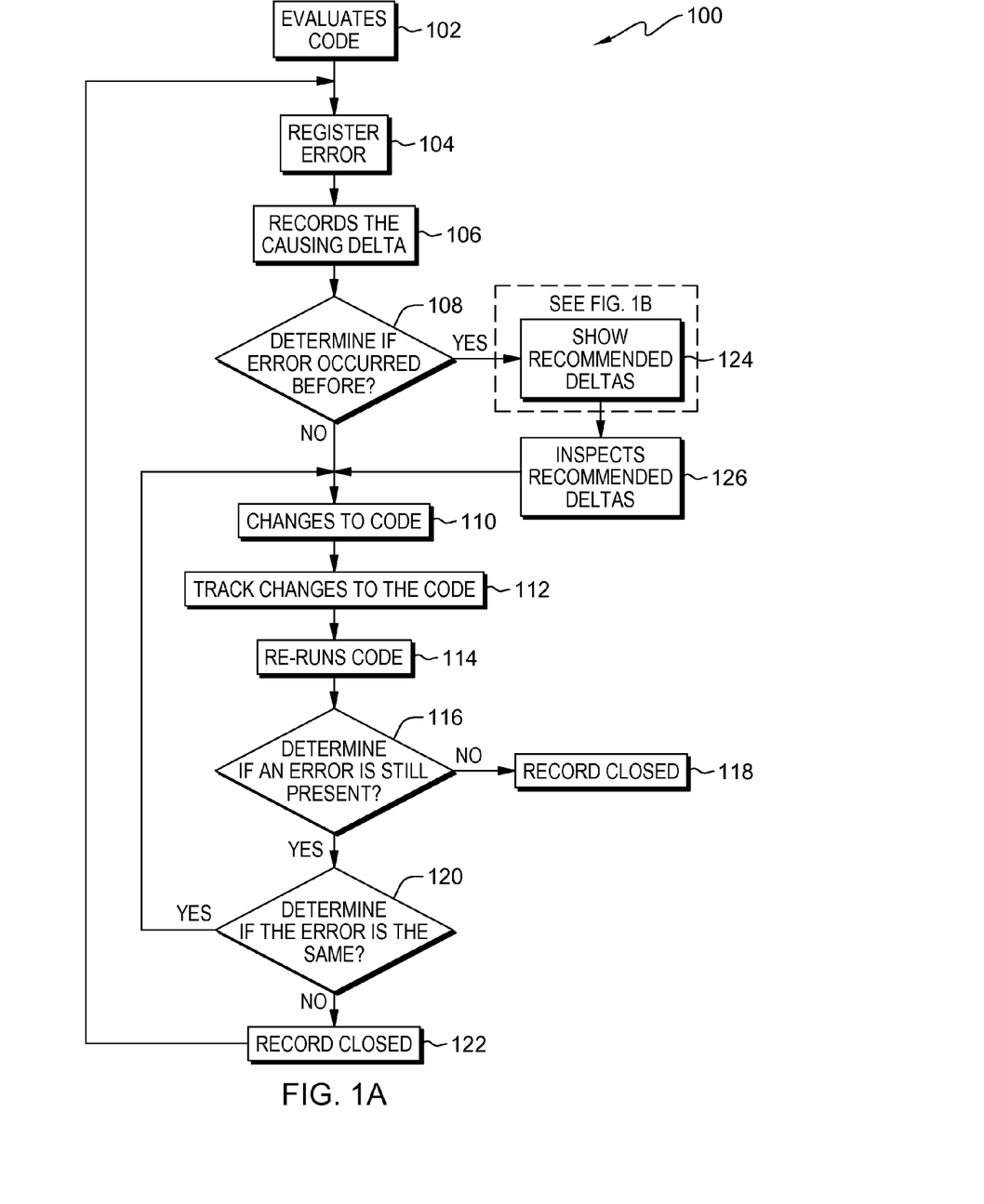
FIG. 1A is a flow diagram of an aspect of a method in accordance with the present invention.

FIG. 1A depicts a flowchart 100 of an aspect of a method in accordance with the present invention. Flowchart 100 depicts the evaluation and alteration of the code to remove the error.

In step 102, error function 408 evaluates code. Evaluating code may include both compiling and running code, as well as additional instances such as pre-compile syntax checks, post compile unit test runs, etc. The term "run" code may be used in the document to include possible instances of evaluation of code. An error may be automatically detected at runtime or manually recorded using a user interface to tracking program 406.

In step 104, error function 408 registers the error. Once the error occurs, error function 408 registers the error has occurred within the code.

In step 106, error function 408 records the causing delta. The causing delta indicates the changes made since the last run/build which did not include the error. The delta is the differences between sequential data. The changes are recorded to a repository. In some embodiments, the changes are automatically recorded to the repository. In additional embodiments, the user has to approve when an actual error has occurred before the causing delta is recorded to the repository.

In decision 108, error function 408 determines if a similar error has occurred in a set of code which is similar to the current code. In one embodiment, error function 408 searches for a similar code in sets of code which are not similar to the current code, but which may be able to correct the error. If the error occurred before (decision 108, YES branch, proceed to step 124) and error function 408. If the error has not occurred before (decision 108, NO branch, proceed to step 110), where user makes changes to the code.

In step 110, error function 408 changes the code. Error function 408 receives the changes made to the code. The changes made to the code by the user are in an attempt to fix the error which occurred. In one embodiment, of the changes made by the user are stored in a repository. In additional embodiments, only the final set of changes made to the code is stored in a repository.

In step 112, error function 408 tracks the changes to the code. Error function 408 may track and make a record of the changeset from when the error occurred and may keep track of the changes within the project, not the changes within a given file. A changeset is a set of changes which should be treated as an indivisible group.

In step 114, error function 408 re-runs the code. The re-running of the code is to determine if the error is still present. The user may select to re-run the code. In some embodiments, the code may rerun automatically once the new code is finished.

In decision 116, error function 408 determines if an error is present. Error function 408 runs the script in the background and determines if the code is stable. Stable code runs without crashing. In some embodiments, stable code may contain errors, but these errors do not crash the code. If an error is present (decision 116, YES branch, proceeded to 110) error function 408 determines if the error is the same error. If an error is not present (decision 116, NO branch, proceed to step 118), the recording is closed.

In step 118, error function 408 closes the record. The record may include for example, the entire code with the error, the initial error, the resulting errors caused from the initial error, the code within a predetermined vicinity to the error, the changes made to the code to correct the error, the code within a predetermined vicinity of the error, or the entire code without the error present. The delta change is set between the runs. In additional embodiments, the final code is stored in the repository. In additional embodiments, the final code, attempted code, or notes and comments are stored in the repository for future use.

In decision 120, error function 408 determines if the error which caused the code to be unstable is the same error which error function 408 located before in step 104. If the error is the same error (YES branch, proceed to 110) and user makes changes to the code. If the error is not the same error (NO branch, proceed to step 122), and the recording is closed.

In step 122, error function 408 closes the record. The record may include the initial error produced with any dates and times removed from the errors since they may cause the error text to differ and may mean which is similar errors are not flagged. The delta change is set between the runs. In additional embodiments, the final code is stored in the repository. In additional embodiments, the final code, attempted code, or notes and comments are stored in the repository for future use. In some embodiments, the error is not the same error, the record may include, the initial error produced with any date and time removed, the changeset between the runs, and the error produced as a result of the changeset.

In step 124, error function 408 shows recommended deltas. The step is explained in greater detail in FIG. 1B.

In step 126, error function 408 inspects recommended delta. In some embodiments error function 408 presents the recommended deltas to the user, and the user selects one of the recommended deltas. In other embodiments, error function 408 automatically selects one of the recommended deltas.

Figure 1B:
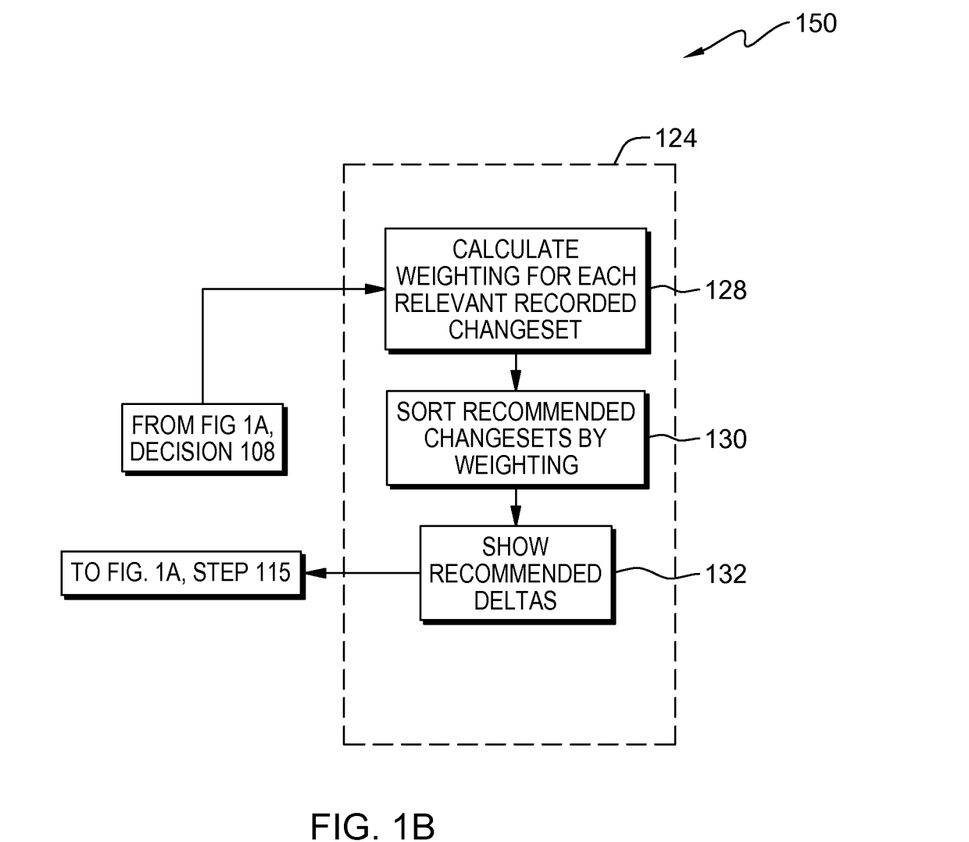
FIG. 1B is a flow diagram of a further aspect of a method in accordance with the present invention.

FIG. 1B depicts a flowchart 150 of an aspect of a method in accordance with the present invention. Flowchart 150 depicts the processing if the error has occurred previously.

In step 128, error function 408 calculates the weighting for each relevant recorded changeset. Factors which error function 408 uses to determine the weight or effectiveness of the recorded changesets are, for example, the similarity of the current error code to the previously recorded error code, the similarity of the causing delta of the current instance and recorded instances, including same file, same package, etc., how closely related the file is to the recorded error occurred in which provides a suggestion to the file causing the error in the current instance, if the error occurred in the same file, the error is a priority over the error which did not occur in the same file, if the error occurred in the same project, the error may have priority over suggestions which are from a different project, similarly, an error recorded on the local machine prioritizes over a delta received from the cloud/online, or whether the proposed delta triggers additional errors whilst removing the current error, with least additional errors prioritized. In one embodiment, the ranking program in place, a cloud solution may be provided. Solutions may be uploaded to the cloud with the ability to compare errors occurring on a local machine against known errors and solutions online.

In step 130, error function 408 sorts the recommended changesets by weight. In some embodiments, error function 408 sorts the recommended changesets in a numerical order dependent on the weight of the changeset. In additional embodiments, error function 408 sorts the recommended change sets in an additional order dependent on the calculated weight, such as, for example, how many times the recommended changeset has been used, if there are comments or flags on the change sets, if the changeset is for the current version. In one embodiment, the previous solutions to an error may be ranked based upon the amount of changes required and/or the relationship with the previous erroneous context.

In step 132, error function 408 shows recommended deltas. Error function 408 presents the recommended deltas to the user. In some embodiments, error function 408 presents only one recommended delta to the user. In additional embodiments, error function 408 presents a plurality of recommended deltas to the user. The recommended deltas may be, for example, presented to the user in order by their respective weights, how many times they have been used effectively in the past, or by additional means of organizing the recommended deltas. The weights of the delta can be, for example, based on the delta's likelihood of success, or the number of times the delta has removed the error from the code allowing the code to run without crashing.

Figure 2A:
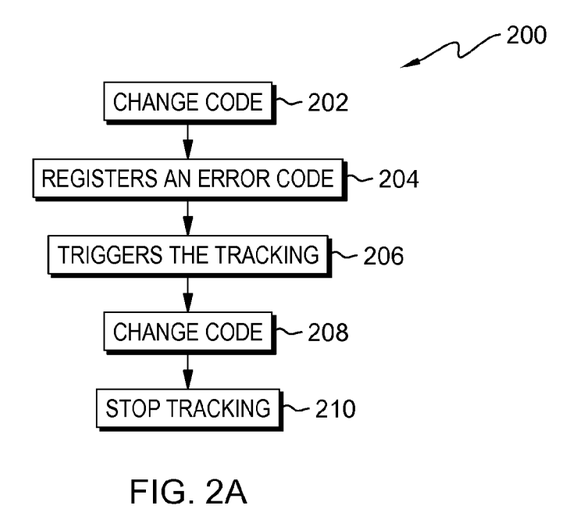
FIG. 2A is a schematic flow diagram of an embodiment of an aspect of a method in accordance with the present invention.

FIG. 2A is a schematic flow diagram of an embodiment of an aspect of a method in accordance with the present invention. Flowchart 200 depicts the processing if the error has occurred previously.

In step 202, code function 410 changes the code. The change is represented as the first change to the code. The change may be, for example, a single element change, or a change to a substantial section of the code. In one embodiment, the code is in a stable form when no error or errors are present in the code. In additional embodiments, the initial code is not in a stable form.

In step 204, code function 410 registers an error code. The error code is a representation for which may be caused due to the change to the code. The change to the code which results in the error code also represents the removal of the code stability. The error code may be, for example, a new error code or an old error code which has already been seen by code function 410 or stored in a repository. The changes which caused the transition from a stable state to an error state may be available to the programmer to help them determine the root cause. In one embodiment, the error code may also be used by the solution lookup for determining the context in which a solution should be suggested. This allows the program to suggest solutions from a previous instance when the error was created in a similar way.

In step 206, code function 410 triggers the tracking. In one embodiment, code function 410 tracks the error state. In tracking the error state, code function 410 may create a record. The record may, for example, include an error state and a solution state. Tracking program 406 may start tracking changes once a new error is created after building the code or at runtime. Code function 410 continues to track changes up until the point where the code is stable, the change and the subsequent changes up until a stable code. In one embodiment, the changes could simply be recorded through screen capture from the point which the error is created to the next time the code becomes stable. Alternatively, the change history of the code from the error being detected up until stability could be stored and made available to the programmer.

In step 208, code function 410 changes the code. The change is to return the code to a stable form. In some embodiments, the change does not bring the code to a stable form but creates new error codes. The code change may be based, for example, on solution state from record, or from an additional source. In one embodiment, code function 410 changes the code until the code is stable.

In step 210, code function 410 stops the tracking. In some embodiments, code function 410 updates the record with the at least one error state and the corresponding at least one solution state. In additional embodiments, code function 410 includes solution state and the steps taken to reach solution state. In one embodiment, the changes which cause the stability and remove the error code may return the code to a stable state.

Figure 2B:
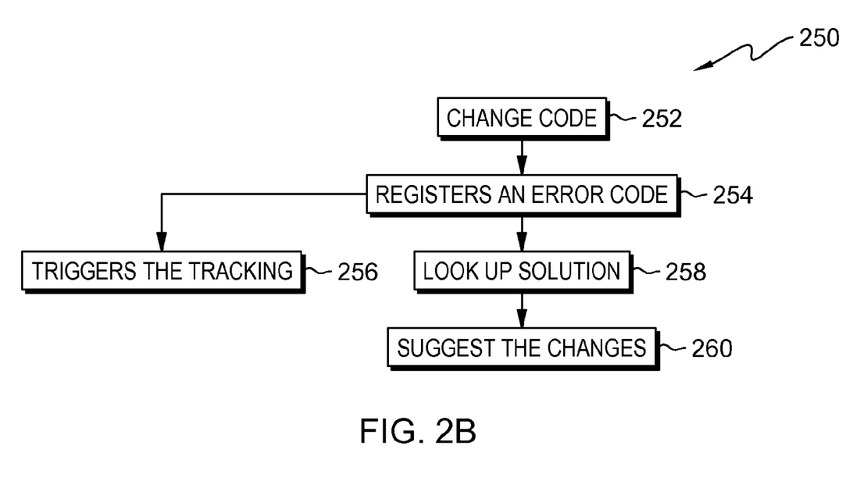
FIG. 2B is a schematic flow diagram of an embodiment of a further aspect of a method in accordance with the present invention.

FIG. 2B is a schematic flow diagram of an embodiment of a further aspect of a method in accordance with the present invention. Flowchart 250 depicts the processing if the error has occurred previously.

In step 252, code function 410 changes code. The change represents a second change to the code. The change may be, for example, a single element change, or a change to a majority of the code. In one embodiment, the code is in a stable form when no error or errors are present in the code. In additional embodiments, the initial code is not in a stable form.

In step 254, code function 410 experiences the error code. In the depicted embodiment, error code is the same error code in FIG. 2A. In other embodiments, the error code can be a different error code than in FIG. 2A.

In step 256, code function 410 triggers the tracking. In one embodiment, code function 410 tracks the error state. Code function 410 continues to track changes up until the point where the code is stable, in the case change and the subsequent changes up until the stable code. The changes could simply be recorded through screen capture from the point which the error is created to the next time the code becomes stable. Alternatively, the change history of the code from the error being detected up until stability could be stored and made available to the programmer.

In step 258, code function 410 looks up a solution. Code function 410 monitors the code being written by the user, and when code function 410 notices an error which is similar to an error which arose in the past. Code function 410 alerts the user of the error and locates a potential solution for the error. Code function 410 may, for example, search for a solution in a repository such as database 412. In some embodiments, the user searches for a solution which is presented to the user, or the user knows what the solution is.

In step 260, code function 410 suggests the changes. Code function 410 presents at least one change which could possibly remove the error from the code. In one embodiment, the user selects the change In additional embodiments, code function 410 tries each suggested change until code function 410 locates a change which removes the error from the code. In some embodiments, the suggested changes are weighted. The weight relates to the likelihood that the change fixes the error code and does not result in another error code being created.

If the programmer decides to execute one suggestion, he or she may be able to click on the suggestion resulting in showing the changes which were used before to receive the code to a stable state. An additional option could be to playback the list of changes made if screen capturing was used to record changes.

The user may be able to implement at least one of the changes and return the code back to a stable state. As tracking program 406 may be running while the programmer is executing the suggested changes, the executed changes may be stored as a new set of changes which resolve the same error. As described in the next paragraph, the new solution could be useful later on if the correction is considered more appropriate given a future context.

In cases where multiple suggestions exist, tracking program 406 could rank suggestions with a priority which could be determined by the relevancy of the suggestions in comparison to the current of state of code. For example, the suggestion which requires the least changes, has similar "caused-by changes" or the suggestion which makes most contextual sense, i.e. if an error has previously occurred in the same file, may be prioritized over the same error which occurred in a different file.

Figure 3A:
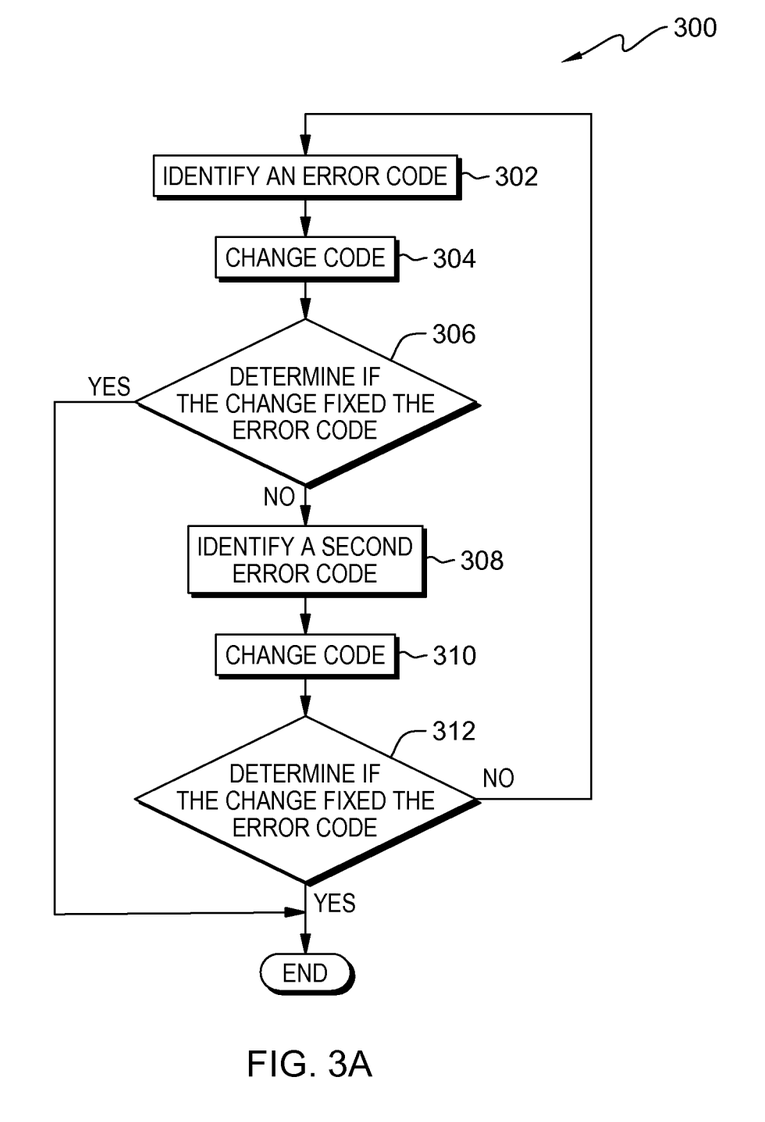
FIG. 3A is a schematic flow diagram of an additional embodiment of an aspect of a method in accordance with the present invention.

FIG. 3A is a schematic flow diagram of an additional embodiment of an aspect of a method in accordance with the present invention. Flowchart 300 depict the process if the error has occurred previously.

In step 302, code function 410 identifies an error code. Code function 410 periodically scans the code while the user is changing the code to locate any errors which arise in the code. In one embodiment, code function 410 performs the task automatically. In additional embodiments, code function 410 performs the task per the request of the user or a third party. In some embodiments, code function 410 records the error in a repository.

In step 304, code function 410 changes the code. Code function 410 changes the code. This step is outlined in greater detail in FIGS. 2A and 2B. In some embodiments, step 305 is recorded in a repository.

In decision 306, code function 410 determines if the change fixed the error. Code function 410 searches the code to determine if the code is stable or unstable. A stable code runs without any errors arising, an unstable code does not run correctly. If code function 410 determines the change fixed the error (decision 306, YES branch, proceed to END) code function 410 ends the procedure. If code function 410 determines the change did not fix the error (decision 306, NO branch, proceed to step 304), code function identifies a second error code.

In step 308, code function 410 identifies a second error code. Code function 410 periodically scans the code while the user is changing the code to locate any errors which arise in the code. The second error is a result of the correction to the first error. In which the modified code produced a new error which is different from the first error. The difference from the first error to the second error may be, for example, the type of error or the location of the error. In one embodiment, code function 410 performs the task automatically. In additional embodiments, code function 410 performs the task per the request of the user or a third party. In some embodiments, code function 410 records the error in a repository.

In step 310, code function 410 changes the code. The step is outlined in greater detail in FIGS. 2A and 2B.

In decision 312, code function 410 determines if the change fixed the error code. The change fixes the error, if the code is stable and runs without crashing. If code function 410 determines the change fixed the error (decision 312, YES branch, proceed to END) code function 410 ends the procedure. Code function 410 determines the change fixed the error by searching the code to determine the code is stable. The code is stable when the code is error free. If code function 410 determines the change did not fix the error (decision 312, NO branch, proceed to step 302), code function identifies the error code.

In some embodiments, the process continues through a plurality of errors which arise after a previous error has been corrected. Code function 410 continues the process of locating an error, changing the error, determining the error is corrected and if a new error has occurred until no new error or errors occur in the code and the code is in a stable state.

Figure 3B:
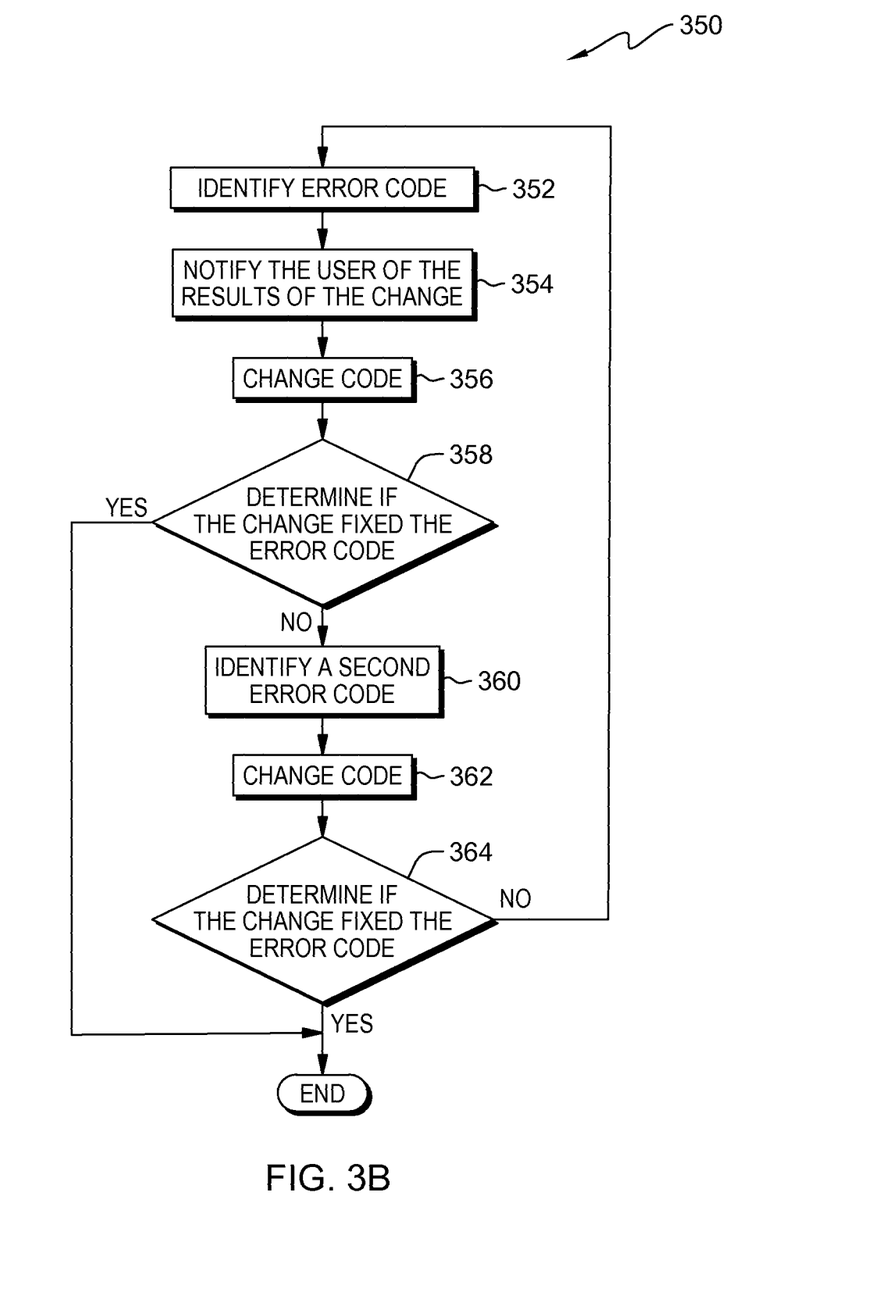
FIG. 3B is a schematic flow diagram of an additional embodiment of a further aspect of a method in accordance with the present invention.

FIG. 3B is a schematic flow diagram of an additional embodiment of a further aspect of a method in accordance with the present invention. Flowchart 350 depict the process if the error has occurred previously, and a notification is presented to the user.

In step 352, code function 410 identifies an error code. Code function 410 periodically scans the code while the user is changing the code to locate any errors which arise in the code. In one embodiment, code function 410 performs the task automatically. In additional embodiments, code function 410 performs the task per the request of the user or a third party. In some embodiments, code function 410 records the error in a repository.

In step 354, code function 410 notifies the user of the result of the change. Code function 410 gathers information from a repository or from an additional source which informs code function 410 that changing the code in a certain way to fix the error, results in an additional error being created. In some embodiments, code function 410 automatically decides to implement the change or an additional change in the code to fix the error. In additional embodiments, code function 410 presents to the user the option to change the code. The option may also include, for example, the option to make the first and second change, make neither change, or make an alternative change. In cases where multiple suggestions exist, the suggestions should be rated both by the relevance of the suggestion and by the amount of related errors the correction introduces; a suggestion which introduces only one related error is preferable to a suggestion which introduces a chain of five related errors. In additional embodiments, code function 410 as well as suggesting a fix to the current error, the program may also provide a view which demonstrates the chain of related errors the fix causes and the fixes for the related errors. The programmer may be able to implement the necessary changes and receive the code to a stable state.

In step 356, code function 410 changes the code. Code function 410 changes the code. This step is outlined in greater detail in FIGS. 2A and 2B. In some embodiments, step 305 is recorded in a repository.

In decision 358, code function 410 determines if the change fixed the error. The change fixed the error if the code is now stable and runs without crashing. If code function 410 determines the change fixed the error (decision 306, YES branch, proceed to END) code function 410 ends the procedure. If code function 410 determines the change did not fix the error (decision 306, NO branch, proceed to step 304), code function identifies a second error code.

In step 360, code function 410 identifies a second error. Code function 410 periodically scans the code while the user is changing the code to locate any errors which arise in the code. The second error is a result of the correction to the first error. In which the modified code produced a new error which is different from the first error. The difference from the first error to the second error may be, for example, the type of error or the location of the error. In one embodiment, code function 410 performs the task automatically. In additional embodiments, code function 410 performs the task per the request of the user or a third party. In some embodiments, code function 410 records the error in a repository.

In step 362, code function 410 changes the code. The step is outlined in greater detail in FIGS. 2A and 2B.

In decision 364, code function 410 determines if the change fixed the error. The change fixes the error, if the code is stable and runs without crashing. If code function 410 determines the change fixed the error (decision 312, YES branch, proceed to END) code function 410 ends the procedure. Code function 410 determines the change fixed the error by searching the code to determine the code is stable. The code is stable when the code is error free. If code function 410 determines the change did not fix the error (decision 312, NO branch, proceed to step 302), code function identifies the error code.

In some embodiments, the process continues through a plurality of errors which arise after a previous error has been corrected. Code function 410 continues the process of locating an error, changing the error, determining the error is corrected and if a new error has occurred until no new error or errors occurs in the code and the code is in a stable state.

Figure 4:
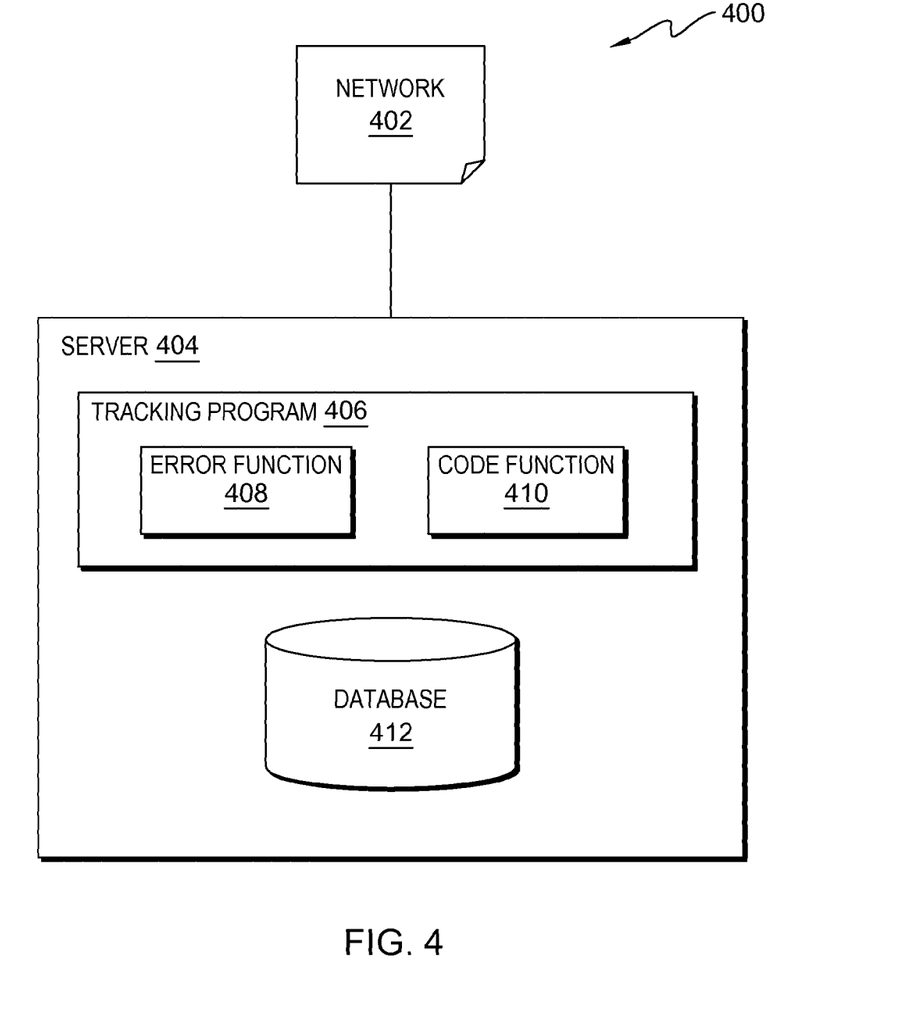
FIG. 4 is block diagram of an example embodiment of a program in accordance with the present invention.

FIG. 4 depicts a block diagram of computing environment 400 in accordance with one embodiment of the present invention. FIG. 1 provides an illustration of one embodiment and does not imply any limitations regarding computing environment 400 in which different embodiments may be implemented. In the depicted embodiment, computing environment 400 includes, but is not limited to, tracking program 406. Computing environment 400 may include additional computing devices, servers, computers, switches, or additional devices not presented.

Network 402 may be a local area network (LAN), a wide area network (WAN) such as the Internet, any combination thereof, or any combination of connections and protocols which support communications between server 404 and additional components connected to network 402, in accordance with embodiments of the invention. Network 402 may include wired, wireless, or fiber optic connections. In the depicted embodiment, network 402 connects server 404. In additional embodiments, network 402 connects server 404 and additional computing devices, servers, computers, components, or additional devices not presented.

Server 404 may be a management server, a web server, or any additional electronic device or computing program capable of processing program instructions and receiving and sending data. In some embodiments, server 404 may be a laptop computer, tablet computer, netbook computer, personal computer (PC), desktop computer, or any programmable electronic device capable of communicating with additional components via network 402. In additional embodiments, server 404 may represent a server computing program utilizing multiple computers as a server program, such as in a cloud computing environment. In an additional embodiment, server 404 represents a computing program utilizing clustered computers and components to act as a single pool of seamless resources. In the depicted embodiment, server 404 includes tracking program 406 and database 412. In additional embodiments, server 404 may include additional components. Server 404 may include components, as depicted and described in further detail with respect to FIG. 5.

Tracking program 406 controls tracking program 406. In the depicted embodiment, tracking program 406 includes error function 408, code function 410, and database 412. In additional embodiments, tracking program 406 may include additional components, and elements.

Error function 408 controls the registration of the error when the error arises in the software development environment. In one embodiment, error function 408 may be an automated component for automatically registering the current error. In an additional embodiment, error function 408 may be controlled by a user or a third party, the user or the third party communicates with error function 408 for manual input of the current error. In the depicted embodiment, error function 408 is located on tracking program 406. In additional embodiments, error function 408 may be located on additional servers, computing devices, or computers provided tracking program 406 may access error function 408.

In one embodiment, error function 408 controls the suggestion of existing records which substantially match a new error. Error function 408 may provide a multitude of results if more than one existing record substantially matches a current error and an error function 408 may provide a weight for the more than one existing record dependent from a similarity to the current error and its environment and/or a minimum amount of consequent errors resulting from the known set of changes.

In a subsequent embodiment, error function 408 may track a subsequent set of changes made which affect a current error. Error function 408 determines if an error is present after a subsequent set of changes, and, if no error or errors are present, the record is stored in a repository. In one embodiment, error function 408 overwrites previous records. In one embodiment, error function 408 register a different error, record the different error and record a reference to the different error in the first record as a consequent error.

Code function 410 controls recording the information in a repository. In one embodiment, code function 410 records errors, changes to the code, and additional information associated with the error or the altered code. In some embodiments, code function 410 stores records in database 412. In one embodiment, code function 410 may provide a search for determining if an existing record matches a current error. Code function 410 may include an error name search function for substantially matching an error to a recorded error and an error causing search function for substantially matching a set of changes made to cause a current error to a recorded set of changes made to cause the recorded error in an existing record. In the depicted embodiment, code function 410 is located on tracking program 406. In additional embodiments, code function 410 may be located on additional servers, computing devices, or computers provided tracking program 406 may access code function 410.

Database 412 may be a repository which may be written to and/or read by tracking program 406, error function 408, and code function 410. In one embodiment, information gathered by tracking program 406 and error function 408 and code function 410 may be stored to database 412. In one embodiment, database 412 is a database management system (DBMS) used to allow the definition, creation, querying, update, and administration of a database(s). In the depicted embodiment, database 412 is stored on server 404 and connected to network 402. In additional embodiments, database 412 may reside on a server, or an additional computing device, provided database 412 is able to communicate with tracking program 406, error function 408, and code function 410.

Figure 5:
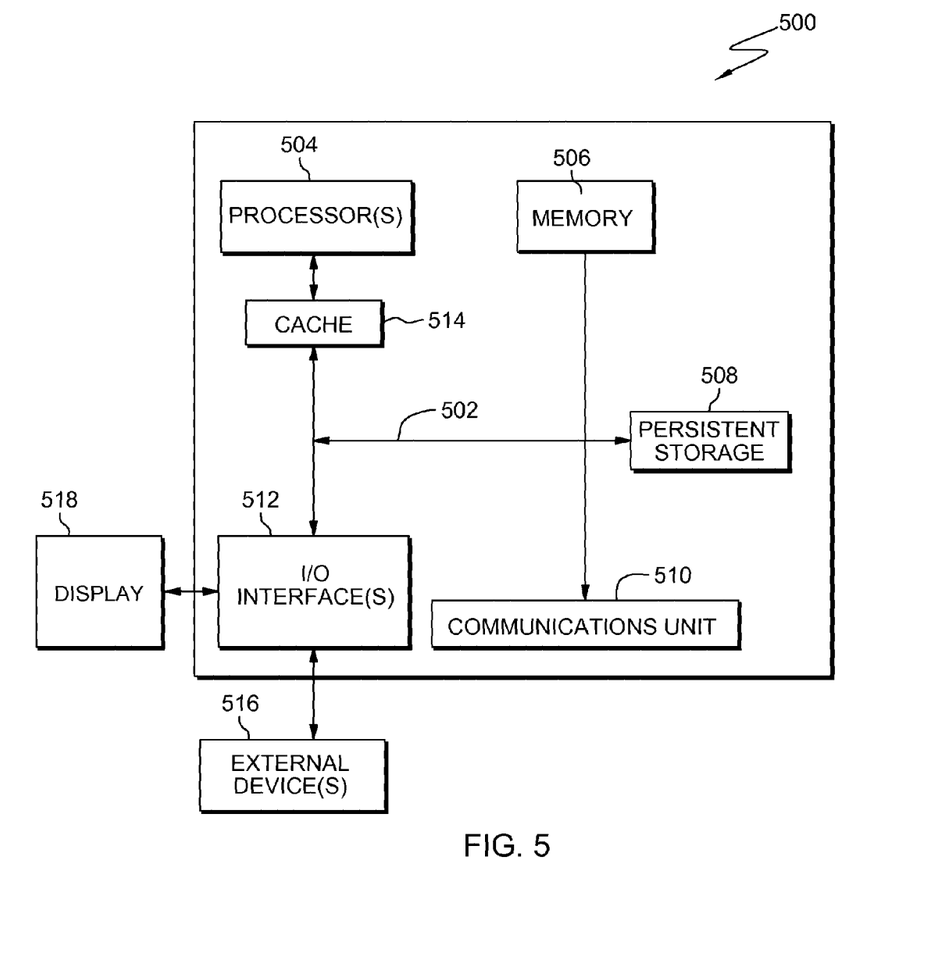
FIG. 5 is a block diagram of an embodiment of a computer program in which the present invention may be implemented.

FIG. 5 depicts a block diagram 500 of components of server 404, in accordance with an illustrative embodiment of the present invention. It should be appreciated FIG. 5 provides only an illustration of one implementation and does not imply any limitations with regard to the environments in which different embodiments may be implemented. Many modifications to the depicted environment may be made.

Server 404 includes communications fabric 502, which provides communications between computer processor(s) 504, memory 506, persistent storage 508, communications unit 510, and input/output (I/O) interface(s) 512. Communications fabric 502 may be implemented with any architecture designed for passing data and/or control information between processors (such as microprocessors, communications and network processors, etc.), program memory, peripheral devices, and any additional hardware components within a program. For example, communications fabric 502 may be implemented with one or more buses.

Memory 506 and persistent storage 508 are computer-readable storage media. In one embodiment, memory 506 includes random access memory (RAM) and cache memory 514. In general, memory 506 may include any suitable volatile or non-volatile computer-readable storage media.

Memory 506 is stored for execution by one or more of the respective computer processors 504 of server 404 via one or more memories of memory 506 of server 404. In the depicted embodiment, persistent storage 508 includes a magnetic hard disk drive. Alternatively, or in addition to a magnetic hard disk drive, persistent storage 508 may include a solid state hard drive, a semiconductor storage device, read-only memory (ROM), erasable programmable read-only memory (EPROM), flash memory, or any additional computer-readable storage media which is capable of storing program instructions or digital information.

The media used by persistent storage 508 may also be removable. For example, a removable hard drive may be used for persistent storage 508. Additional examples include optical and magnetic disks, thumb drives, and smart cards which are inserted into a drive for transfer onto an additional computer-readable storage medium which is also part of persistent storage 508.

Communications unit 510, in the examples, provides for communications with additional data processing programs or devices, including server 404. In the examples, communications unit 510 includes one or more network interface cards. Communications unit 510 may provide communications through the use of either or both physical and wireless communications communicates.

I/O interface(s) 512 allows for input and output of data with additional devices which may be connected to server 404. For example, I/O interface 512 may provide a connection to external devices 516 such as a keyboard, keypad, camera, a touch screen, and/or some additional suitable input device. External devices 516 may also include portable computer-readable storage media such as, for example, thumb drives, portable optical or magnetic disks, and memory cards. Software and data used to practice embodiments of the present invention, e.g., function of tracking program 406 may be stored on such portable computer-readable storage media and may be loaded onto persistent storage 508 of server 404 via I/O interface(s) 512 of server 404. Software and data used to practice embodiments of the present invention, e.g., error function 408 or code function 410 may be stored on such portable computer-readable storage media and may be loaded onto persistent storage 508 of server 404 via I/O interface(s) 512 of server 404. I/O interface(s) 512 also connect to a display 518.

Display 518 provides a mechanism to display data to a user and may be, for example, a computer monitor.

The present invention may be a program, a method, and/or a computer program product. The computer program product may include a computer readable storage medium (or media) having computer readable program instructions thereon for causing a processor to carry out aspects of the present invention.

The computer readable storage medium may be a tangible device which may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or additional freely propagating electromagnetic waves, electromagnetic waves propagating through a waveguide or additional transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (programs), and computer program products according to embodiments of the invention. It is be understood each block of the flowchart illustrations and/or block diagrams, and combinations of blocks in the flowchart illustrations and/or block diagrams, may be implemented by computer readable program instructions.

The computer readable program instructions may be provided to a processor of a general purpose computer, special purpose computer, or additional programmable data processing apparatus to produce a machine, such that the instructions, which execute via the processor of the computer or additional programmable data processing apparatus, create means for implementing the functions/acts specified in the flowchart and/or block diagram block or blocks. The computer readable program instructions may also be stored in a computer readable storage medium may direct a computer, a programmable data processing apparatus, and/or additional devices to function in a particular manner, such the computer readable storage medium having instructions stored therein includes an article of manufacture including instructions which implement aspects of the function/act specified in the flowchart and/or block diagram block or blocks.

The computer readable program instructions may also be loaded onto a computer, additional programmable data processing apparatus, or additional device to cause a series of operational steps to be performed on the computer, additional programmable apparatus or additional device to produce a computer implemented process, such the instructions which execute on the computer, additional programmable apparatus, or additional device implement the functions/acts specified in the flowchart and/or block diagram block or blocks.

The flowchart and block diagrams in the Figures illustrate the architecture, functionality, and operation of possible implementations of programs, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks presented in succession may, in fact, be executed substantially concurrently, or the blocks may sometimes be executed in the reverse order, depending upon the functionality involved. It is also be noted each block of the block diagrams and/or flowchart illustration, and combinations of blocks in the block diagrams and/or flowchart illustration, may be implemented by special purpose hardware-based programs which perform the specified functions or acts or carry out combinations of special purpose hardware and computer instructions.

What is claimed is:

1. A method for error and solution tracking, the method comprising:
   identifying, by one or more processors, that a first occurrence of a first error is present in code;
   tracking, by one or more processors, a first set of actions made to the code which affect the first occurrence of the first error;
   determining, by one or more processors, that the first occurrence of the first error has been resolved;
   recording, by one or more processors, the first error and the first set of actions to the code;
   identifying, by one or more processors, that a second occurrence of the first error is present in the code;
   determining, by one or more processors, that the first error has previously occurred;
   retrieving, by one or more processors, the first set of actions;
   causing, by one or more processors, the first set of actions to be made to the code to affect the second occurrence of the first error;
   determining, by one or more processors, that the second occurrence of the first error has been resolved;
   recording, by one or more processors, the first error, the first set of actions to the code, and an indication that the first set of actions has resolved the second occurrence of the first error;
   determining, by one or more processors, that the first set of actions to the code that affected the second occurrence of the first error caused a second error to occur within the code; and
   wherein recording the first error, the first set of actions to the code, and an indication that the first set of actions has resolved the second occurrence of the first error further comprises recording the second error.

2. The method of claim 1, wherein causing the first set of actions to be made to the code to affect the second occurrence of the first error comprises:
   presenting, by one or more processors, the first set of actions to a user;
   receiving, by one or more processors, an indication that the first set of actions have been selected by the user; and
   causing, by one or more processors, the selected first set of actions to be made to the code to affect the second occurrence of the first error.

3. The method of claim 1, further comprising:
   presenting, by one or more processors, an ordering of at least one option to fix the second occurrence of the first error, wherein the ordering of the at least one option is based on: a similarity of error code to the second occurrence of the first error, whether the proposed option occurred in the same project, and whether the proposed option triggers additional errors.

4. The method of claim 1, wherein determining that the first error has previously occurred comprises:
   collecting, by one or more processors, at least one set of actions; and
   selecting, by one or more processors, one of the at least one set of actions based on a predetermined threshold, wherein the predetermined threshold is based on matching the previously occurred error with an error associated with the at least one set of actions.

5. A computer program product for error and solution tracking, the computer program product comprising:
   one or more computer readable storage media and program instructions stored on the one or more computer readable storage media, the program instructions comprising:
   program instructions to identify that a first occurrence of a first error is present in code;
   program instructions to track a first set of actions made to the code which affect the first occurrence of the first error;

program instructions to determine that the first occurrence of the first error has been resolved;
program instructions to record the first error and the first set of actions to the code;
program instructions to identify that a second occurrence of the first error is present in the code;
program instructions to determine that the first error has previously occurred;
program instructions to retrieve the first set of actions;
program instructions to cause the first set of actions to be made to the code to affect the second occurrence of the first error;
program instructions, stored on the one or more computer readable storage media, to determine that the second occurrence of the first error has been resolved;
program instructions, stored on the one or more computer readable storage media, to record the first error, the first set of actions to the code, and an indication that the first set of actions has resolved the second occurrence of the first error;
program instructions to determine that the first set of actions to the code that affected the second occurrence of the first error caused a second error to occur within the code; and
wherein recording the first error, the first set of actions to the code, and an indication that the first set of actions has resolved the second occurrence of the first error further comprises recording the second error.

6. The computer program product of claim 5, wherein the program instructions to cause the first set of actions to be made to the code to affect the second occurrence of the first error comprise:
program instructions to present the first set of actions to a user;
program instructions to receive an indication that the first set of actions have been selected by the user; and
program instructions to cause the first set of actions to be made to the code to affect the second occurrence of the first error.

7. The computer program product of claim 5, further comprising:
program instructions to present an ordering of at least one option to fix the second occurrence of the first error, wherein the ordering of the at least one option is based on: a similarity of error code to the second occurrence of the first error, whether the proposed option occurred in the same project, and whether the proposed option triggers additional errors.

8. The computer program of claim 5, wherein program instructions to determine that the first error has previously occurred comprise:
program instructions to collect at least one set of actions; and
program instructions to select one of the at least one set of actions based on a predetermined threshold, wherein the predetermined threshold is based on matching the previously occurred error with an error associated with the at least one set of actions.

9. A computer system for error and solution tracking, the computer system comprising:
one or more computer processors, one or more computer readable storage media, and program instructions stored on the one or more computer readable storage media for execution by, at least one of the one or more processors, the program instructions comprising:
program instructions to identify that a first occurrence of a first error is present in code;
program instructions to track a first set of actions made to the code which affect the first occurrence of the first error;
program instructions to determine that the first occurrence of the first error has been resolved;
program instructions to record the first error and the first set of actions to the code;
program instructions to identify that a second occurrence of the first error is present in the code;
program instructions to determine that the first error has previously occurred;
program instructions to retrieve the first set of actions;
program instructions to cause the first set of actions to be made to the code to affect the second occurrence of the first error;
program instructions to determine that the second occurrence of the first error has been resolved;
program instructions to record the first error, the first set of actions to the code, and an indication that the first set of actions has resolved the second occurrence of the first error;
program instructions to determine that the first set of actions to the code that affected the second occurrence of the first error caused a second error to occur within the code; and
wherein recording the first error, the first set of actions to the code, and an indication that the first set of actions has resolved the second occurrence of the first error further comprises recording the second error.

10. The computer system of claim 9, wherein program instructions to cause the first set of actions to be made to the code to affect the second occurrence of the first error comprise:
program instructions to present the first set of actions to a user;
program instructions to receive an indication that the first set of actions have been selected by the user; and
program instructions to cause the first set of actions to be made to the code to affect the second occurrence of the first error.

11. The computer system of claim 9, further comprising:
program instructions to present an ordering of at least one option to fix the second occurrence of the first error, wherein the ordering of the at least one option is based on: a similarity of error code to the second occurrence of the first error, whether the proposed option occurred in the same project, and whether the proposed option triggers additional errors.

* * * * *